United States Patent [19]

Okauchi et al.

[11] Patent Number: 4,800,453
[45] Date of Patent: Jan. 24, 1989

[54] RECORDING AND/OR REPRODUCING APPARATUS ADAPTED FOR UTILIZATION OF RECORD BEARING MEDIA OF A DISC TYPE

[75] Inventors: Shigeki Okauchi; Tsukasa Uehara, both of Tokyo, Japan

[73] Assignee: Canon Kabushiki Kaisha

[21] Appl. No.: 65,648

[22] Filed: Jun. 22, 1987

Related U.S. Application Data

[63] Continuation of Ser. No. 663,963, Oct. 23, 1984, abandoned.

[30] Foreign Application Priority Data

Oct. 27, 1983 [JP] Japan .................................. 58-201519

[51] Int. Cl.⁴ ...................... G11B 5/012; G11B 17/04
[52] U.S. Cl. .................. 360/99.02; 369/270; 360/99.04; 360/99.08
[58] Field of Search ...................... 360/69, 71, 86, 97, 360/99, 133; 369/75.2, 258, 261, 270, 271

[56] References Cited

U.S. PATENT DOCUMENTS

| | | | |
|---|---|---|---|
| 3,480,282 | 11/1969 | Mindell et al. | 369/270 X |
| 4,498,161 | 2/1985 | Eisemann | 369/270 X |
| 4,498,165 | 2/1985 | Wilkinson | 369/270 |
| 4,502,136 | 2/1985 | Rickert et al. | 369/271 |
| 4,509,157 | 4/1985 | Morinaga | 369/75.2 |
| 4,620,249 | 10/1986 | Suzaki et al. | 360/99 |

FOREIGN PATENT DOCUMENTS

| | | | |
|---|---|---|---|
| 55-108963 | 8/1980 | Japan | 360/69 |
| 56-134357 | 10/1981 | Japan | 360/99 |

*Primary Examiner*—John H. Wolff
*Attorney, Agent, or Firm*—Toren, McGeady & Associates

[57] ABSTRACT

A recording and/or reproducing apparatus using a disc shaped record bearing medium which includes a recording and/or reproducing head; a drive mechanism for rotating the medium relative to the head; a pressing device for pressing a portion of the medium to mount the medium on the drive mechanism; and a control system for rendering the drive mechanism operative in response to a release of the pressing device from the pressing action.

21 Claims, 3 Drawing Sheets

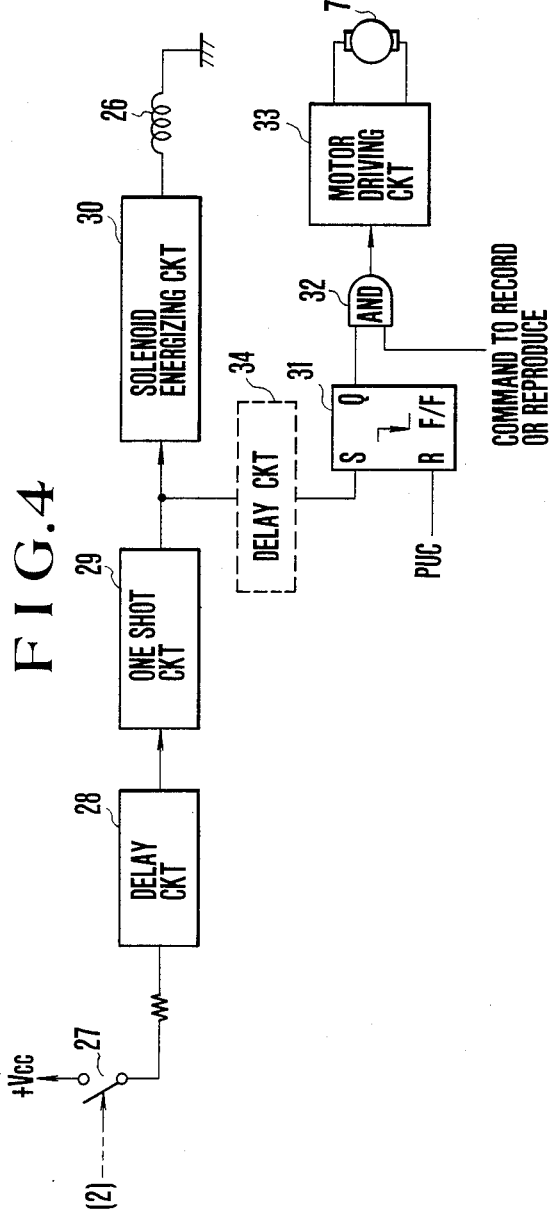
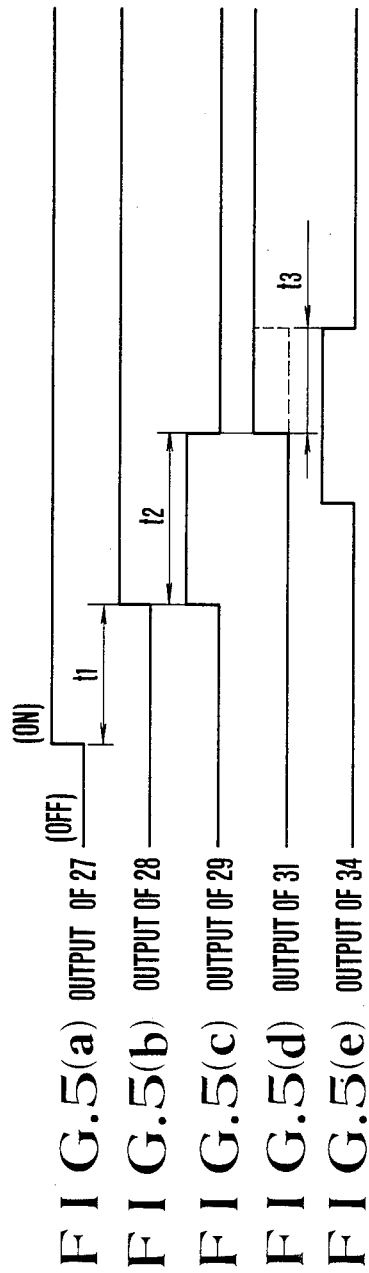

RECORDING AND/OR REPRODUCING APPARATUS ADAPTED FOR UTILIZATION OF RECORD BEARING MEDIA OF A DISC TYPE

This is a continuation of application Ser. No. 663,963, filed Oct. 23, 1984 now abandoned.

BACKGROUND OF THE INVENTION

1. Field of the Invention:

This invention relates to a recording and/or reproducing apparatus of the kind using a disc shaped record bearing medium such as a rotating magnetic sheet or disc.

2. Description of the Prior Art:

In a recording and/or reproducing apparatus of the kind using a disc shaped rotating record bearing medium such as a rotating magnetic sheet or disc, a center core is attached to the middle part of the magnetic sheet. In rotating the magnetic sheet, this center core is fitted onto a spindle which is arranged to be rotated by a sheet rotating motor. However, if the fitted engagement of the center core and the spindle is loose, the magnetic sheet tends to fail to normally rotate during recording or reproduction and, if the engagement is too tight, the magnetic sheet cannot be readily mounted on the spindle. In view of this, there has been proposed a magnetic coupling method, in which the spindle is provided with a permanent magnet and the center core with a soft magnetizable plate, so that the two can be reliably coupled by having the soft magnetizable plate attracted by the permanent magnet. However, even in accordance with the magnetic coupling method, it is still difficult to have the center core always accurately positioned on a reference surface, such as a flange surface of the spindle. Therefore, this method fails to ensure that the magnetic sheet is always in a prescribed confronting state relative to the recording and/or reproducing head. Further, in the case of a still picture recording and/or reproducing apparatus which severely requires mounting precision, it is necessary to use a force of several hundred grams for mounting the center core on the spindle. Hence, this requirement necessitates use of a large magnet, which hinders efforts to reduce the size and weight of the apparatus. In another method of the prior art for this purpose, the magnetic disc or sheet is pressed by means of a pressing mechanism against the spindle in such a manner as in the case of floppy disc devices. A device employing this method is arranged to rotate while the above-stated mechanism is left in a state of pressing the magnetic disc. This arrangement causes an increase in load on the motor and also results in uneven disc rotation.

To eliminate this inconvenience, there has been proposed an apparatus of the type having temporary pressing means for mounting a record bearing medium on rotating drive means. The apparatus of this type has been disclosed, for example, in U.S. patent application Ser. No. 591,383 filed Mar. 20, 1984, and U.S. patent application Ser. No. 637,392 filed Aug. 3, 1984 by the inventors of the present invention.

SUMMARY OF THE INVENTION

The present invention is a further improvement on the inventions under the previous patent applications mentioned in the foregoing. It is an object of the invention to provide a recording and/or reproducing apparatus which permits accurately and reliably mounting a disc-shaped record bearing medium on rotating drive means; does not impose a large load on the drive means for rotating the record bearing medium; permits reduction in size of the rotating drive means; and is capable of adequately controlling the timing for enabling the rotating drive means, so that the medium can be safely loaded without any troubles and smooth rotation of the medium after loading can be ensured.

Under this object and according to a preferred embodiment embodying an aspect of the present invention, a recording and/or reproducing apparatus using a disc-shaped record bearing medium, comprises a recording and/or reproducing head, drive means for rotating the medium relative to the head, pressing means for pressing a portion of the medium to mount the medium on the drive means, and control means responsive to the releasing of the pressing of the medium by the pressing means for enabling the drive means.

The above and further objects and features of this invention will become apparent from the following description of a preferred embodiment thereof taken in connection with the accompanying drawings.

BRIEF DESCRIPTION OF THE DRAWINGS

FIG. 4 is a diagram showing an example of a control circuit for a solenoid and a sheet rotating motor.

FIGS. 5(a)–5(e) show in a timing chart the inputs and outputs of various parts of the circuit arrangement shown in FIG. 4.

DETAILED DESCRIPTION OF THE PREFERRED EMBODIMENTS

In the description of this specification, the term "record bearing medium" means for the purpose of this invention a disc shaped record bearing medium for magnetic or optical or electrostatic capacity type recording and/or reproduction; and the term "record bearing medium driving means" means a drive source such as a motor or the like and a drive member such as a spindle connected to the drive source.

Figure 1:
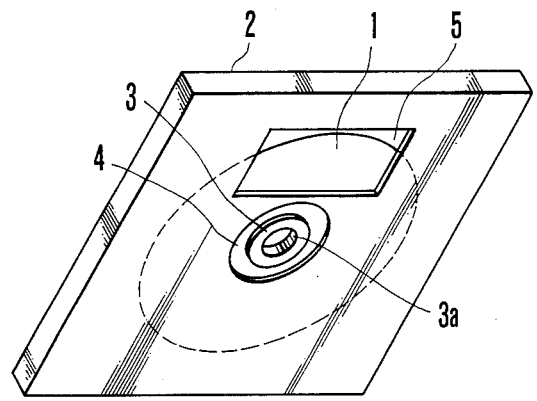
FIG. 1 is an oblique view of a magnetic sheet cassette usable in an embodiment of this invention.
Figure 2:
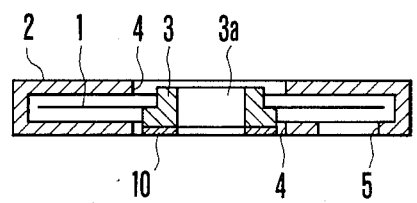
FIG. 2 is a sectional view showing the essential parts of the conventional recording and/or reproducing apparatus.
Figure 2:
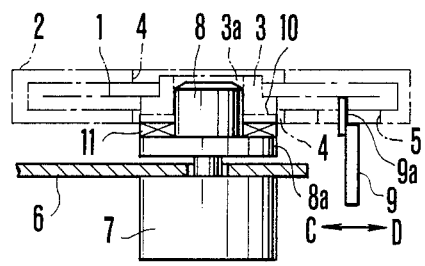

In the following description, the record bearing medium is a rotating magnetic sheet. FIG. 1 shows a cassette containing the magnetic sheet therein. FIG. 2 shows the conventional recording and/or reproducing apparatus. Referring to FIG. 1, a reference numeral 1 denotes the magnetic sheet. A numeral 2 denotes the cassette which is formed in a box-like frame shape. The illustration includes a center core 3 which is provided with a center hole 3a and is secured to the middle part of the magnetic sheet 1; openings 4 formed on the cassette 2 in correspondence to the center core 3; and another opening 5 formed on the cassette 2 to permit a magnetic head which will be described later to be inserted therein. Signal recording or reproduction is performed through the magnetic head with the magnetic sheet 1 mounted on the recording and/or reproducing apparatus in a state of being contained within the cassette 2.

The essential parts of the conventional recording and/or reproducing apparatus are arranged as shown in a sectional view in FIG. 2. In FIG. 2, one-dot chain lines show the cassette 2 as in a loaded or mounted state. The members indicated by the same reference numerals as those used in FIG. 1 are arranged and function in the same manner as the corresponding ones shown in FIG. 1 and thus require no further description. The apparatus includes an internal chassis 6; a sheet rotating motor 7 which is mounted on the chassis 6 and is arranged to serve as record bearing medium rotating and driving means; and a spindle 8 which is attached to a rotor shaft of the sheet rotating motor 7 and serves as rotating drive member. The center core 3 is provided for the purpose of accurately mounting the magnetic sheet 1 on the spindle 8 and is made of a plastic or the like. A numeral 9 denotes a magnetic recording and/or reproducing head. A head carriage 9 is arranged to carry the head 9a and to move it in the directions of arrows C and D, i.e in the radial direction of the sheet 1. The head carriage 9 is driven by a known mechanism (not shown). A soft magnetizable plate 10 is secured to the lower surface of the center core 3. A permanent magnet 11 is attached to a flange part 8a of the spindle 8. The center core 3 and the spindle 8 are magnetically coupled and secured to each other through these members 10 and 11.

However, in accordance with this prior art arrangement, it is hardly possible to ensure that the magnetic sheet 1 is always positioned on a predetermined plane. Further, in case where a clamp mechanism is arranged to forcibly push the magnetic sheet 1 or the center core 3 against the spindle 8 as in the case of a floppy disc device, for example, the sheet rotating motor 7 has to rotate in a state of being loaded with the clamp mechanism. With the load on the motor 7 thus increased, the rotation of the motor 7 becomes uneven.

Figure 3A:
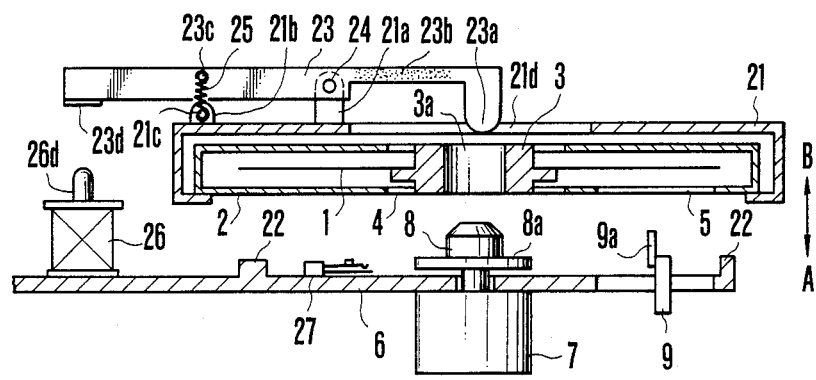
FIGS. 3(a), 3(b) and 3(c) are sectional views of the essential parts of an embodiment of a recording and/or reproducing apparatus arranged according to the present invention, FIG. 3(a) showing the apparatus as in a state of having a cassette holder set in an uplifted position, FIG. 3(b) showing it as in a state of having the cassette holder in a lowered position and FIG. 3(c) showing it as in a state of having the cassette holder operated in the lowered position.
Figure 3B:
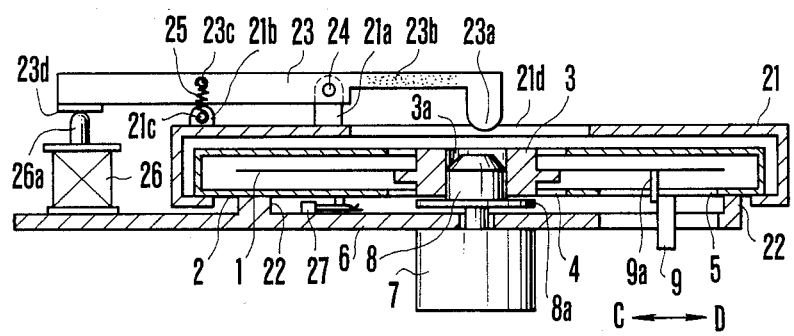
Figure 3C:
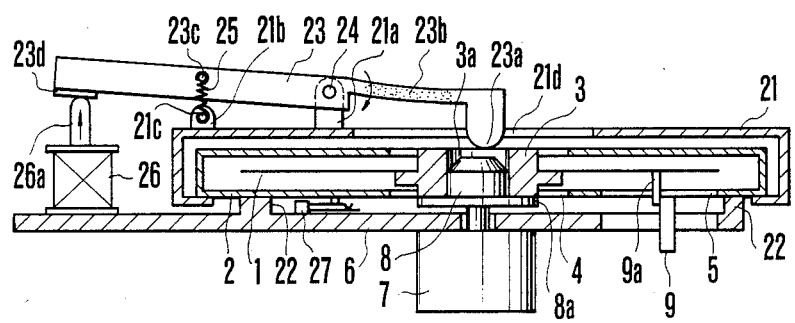

An embodiment of the present invention is arranged as shown in FIG. 3(a)–3(c) and 4. In FIGS. 3(a), 3(b) and 3(c), the members that are arranged and function in the same manner as the corresponding members shown in FIGS. 1 and 2 are indicated by the same reference numerals and description of them is omitted here. The embodiment includes a cassette holder 21 which is arranged to shift the cassette 2 to a predetermined recording and/or reproducing position within the apparatus. The cassette holder 21 is movalbe in the direction of arrows A and B as shown in FIG. 3(a). The cassette 2 is inserted into the holder 21 and taken out therefrom when the holder 21 is in the position as shown in FIG. 3(a). The cassette holder 21 is shiftable relative to the chassis 6 by shifting means (not shown) between an uplifted position where the cassette 2 can be inserted and taken out as shown in FIG. 3(a) and a lowered position as shown in FIGS. 3(b) and 3(c). Recording and/or reproduction can be performed with the cassette holder 21 in the lowered position. The holder 21 is placed and set in either of these positions by suitable means (not shown).

There are provided a plurality of parts 22 which are provided on the chassis 6 for supporting the cassette 2. These support parts 22 may be either formed in one unified body with the chassis 6 or separately from the chassis 6.

An arm 23 serves as pressing means and is turnable on a shaft 24. The shaft 24 is mounted on a raised part 21a provided on the upper surface of the cassette holder 21. The arm 23 is provided with a pressing end part 23a. Referring to FIG. 3(c), with the are 23 turned clockwise, the end part 23a comes through the opening 21d of the cassette holder 21 to push the center core 3 onto the spindle 8. For this purpose, the end part 23a may be formed, for example, into a forked shape consisting of two knife-edge-like or protrudent end parts arranged to act on respective diametrically opposite points on an annular upper surface of the center core 3 above and below the paper of FIG. 3(a). Instead of this arrangement, the center core 3 may be provided with a top board on its upper surface and the end part 23a of the arm 23 may be arranged to push the middle part of the top board of the center core 3.

In pushing the center core 3 onto the spindle 8, the flange part 8a of the spindle 8 provides a reference plane for determining the vertical position of the center core 3. A portion of the arm 23 leading to the end part 23a is formed into a narrow neck part 23b which is elastically arranged to warp and absorb the overshot in pushing the center core 3 as shown in FIG. 3(c).

A spring 25 is arranged between a spring peg 23c provided on the arm 23 and a pin 21c on a raised part 21b of the cassette holder 21 to urge the arm 23 to turn counterclockwise. The counterclockwise movement of the arm 23 is restricted by the fore end of the raised part 21b with the lower surface of the arm 23 impinging thereon. With the two in the impinged state, the pressing end part 23a of the arm 23 is away from the internal space of the cassette holder 21 as shown in FIGS. 3(a) and 3(b).

A solenoid 26 is secured to the chassis 6 and forms pressing means in conjunction with the arm 23. The solenoid 26 is provided with an armature rod 26a. When the solenoid 26 is energized, the armature rod 26a is caused to pop up to a predetermined extent. As shown in FIG. 3(b), the armature rod 26a is arranged to be in close contact with a bent part 23d of the tail end of the arm 23 when the arm 23 moves down together with the cassette holder 21.

A normally open type switch 27 detects that the cassette 2 is placed in the above-stated predetermined recording and/or reproducing position. As shown in FIGS. 3(b) and 3(c), this switch 27 is arranged on the chassis 6 to be closed by the lower surface of the cassette 2 when the cassette holder 21 comes down to said predetermined position.

FIG. 4 shows a control circuit for control over the solenoid 26 and the motor 7. A delay circuit 28 delays a high level signal (FIG. 5(a)) which is produced when the switch 27 closes. The high level signal is thus delayed for a relatively short period of time t1 (FIG. 5(b)) until the cassette 2 stably settles in the recording and/or reproducing position shown in FIG. 3(b) when it is loaded on the apparatus. A one-shot circuit 29 (monostable multivibrator) produces a signal as shown in FIG. 5(c) in response to a high level output of the delay circuit 28. The signal produced from the one-shot circuit 29 is at a high level for a predetermined period of time t2, which is required for energizing the solenoid 26 to actuate the arm 23 by the rod 26a and for having the center core 3 of the magnetic sheet 1 pushed onto the spindle 8 until the center core 3 comes to be restricted by the flange part 8a of the spindle 8. A solenoid energizing circuit 30 energizes the solenoid 26 for the above-stated period of time t2 in response to the high level signal from the above-stated one-shot circuit 29. A fall edge synchronizing type RS flip-flop 31, for example, is set by a power-up-clear signal (PUC) and is reset when the level of the output of the one-shot circuit 29 changes from the high level to a low level. An AND circuit 32 is arranged to receive the output Q of the flip-flop 31 which is provided as shown in FIG. 5(d) and a command signal which commands to record or to reproduce and is obtained by operating, for example, a recording mode switch (not shown) or a reproducing mode switch (not shown). A motor driving circuit 33 renders the sheet rotating motor 7 operative in response to a high level output of the AND circuit 32. The motor 7 is thus under the control of the above-stated circuit arrangement.

Referring again to FIGS. 3, 4 and 5(a)-5(e), the recording and/or reproducing apparatus arranged according to the invention as described in the foregoing operates in the following manner: With the cassette holder 21 in the uplifted state as shown in FIG. 3(a), the magnetic sheet cassette 2 is inserted into the cassette holder 21. The holder 21 is then moved down in the direction of arrow A. For moving the holder 21 downward, the holder 21 is, for example, connected to either the body or cover of the apparatus and is moved down either by a manual operation or by suitable driving means.

When the cassette holder 21 reaches the lowered position as shown in FIG. 3(b), the holder 21 is locked in the lowered position by suitable means (not shown). Under this condition, the bent part 23d of the tail end of the arm 23 is closely confronting the fore end of the armature rod 26a of the solenoid 26 while the switch 27 is closed by a part of the lower surface of the cassette 2. With the switch 27 thus closed, the output level of the delay circuit 28 becomes high after the lapse of the predetermined period of time t1 as shown in FIGS. 5(a) and 5(b). In response to the high level output of the delay circuit 28, the one-shot circuit 29 comes to produce a high level signal as shown in FIG. 5(c). Then, the solenoid energizing circuit 30 energizes the solenoid 26 in response to the high level signal from the one-shot circuit 29. With the solenoid 26 thus energized, the armature rod 26a pops up as shown in FIG. 3(c). The bent part 23d of the tail end of the arm 23 is pushed up by the rod 26a and the arm 23 turns clockwise against the force of the spring 25. As a result of this, the pressing end part 23a of the arm 23 pushes the center core 3 of the magnetic sheet 1 onto the spindle 8 to cause it to abut on the flange part 8a of the spindle 8. The overshot turning movement of the arm 23 is then absorbed by a warping effect of the narrow neck part 23b of the arm 23. Therefore, the center core 3 and the flange part 8a of the spindle 8 can be effectively prevented from being damaged.

When a predetermined period of time t2 elapses after the output level of the one-shot circuit 29 becomes high, the output level of the one-shot circuit 29 becomes low as shown in FIG. 5(c). This change causes the solenoid energizing circuit 30 to cut off power supply to the solenoid 26. With the power supply to the solenoid 26 thus cut off, the armature rod 26a descends. The spring 25 then causes the arm 23 to turn counterclockwise. Thereby, the center core 3 is released from the pressing action of the pressing end part 23a of the arm 23. Thus, the condition as shown in FIG. 3(b) is obtained.

On the other hand, with the output of the one-shot circuit 29 changing from the high level to the low level, the flip-flop 31 is set and the Q output thereof becomes a high level as shown in FIG. 5(d). Therefore, if the recording or reproduction command signal is applied to the AND circuit 33 at this point of time, the output level of the AND circuit 32 becomes high. Then, in response to the high level output of the AND circuit 32, the motor driving circuit 33 renders the sheet rotating motor 7 operative. Therefore, the magnetic sheet 1 can be rotated upon completion of the center core pushing operation.

In accordance with the arrangement of this embodiment, as described in the foregoing, the circuit of FIG. 4 causes the pressing arm 23 to press the center core 3 against the spindle 8 for a predetermined period of time t2 after the lapse of a predetermined period of time t1 with the cassette 2 placed in the recording or reproducing position. Then, concurrently with the lapse of the predetermined period of time t2, the center core 3 is released from the pressing or pushing action and, at that point of time, the sheet rotating motor 7 becomes enabled. Therefore, in loading the cassette 2, the center core 3 is pushed after the cassette 2 has reached the predetermined recording and/or reproducing position. Then, it is after completion of the pushing action that the rotation of the sheet 1 becomes possible by the motor 7. In order to ensure that the motor 7 is enabled to operate after the arm 23 is duly separated from the center core 3, the circuit arrangement of FIG. 4 may include another delay circuit 34 as indicated by a broken line there. In that event, the delay circuit 34 is arranged between the one-shot circuit 29 and the flip-flop 31 to delay the output of the one-shot circuit 29 as shown in FIG. 5(e) for a period of time t3 which is sufficiently long to have the arm 23 stabilized after it is returned by the spring 25 and to have the pressing end part 23a of the arm 23 safely moved away from the center core 3. With the delay circuit 34 arranged in this manner, the point of time at which the flip-flop 31 is set can be delayed for the above-stated period of time t3 as indicated by a broken line in FIG. 5(d).

In accordance with the invention, the magnetic coupling method of the prior art in which the permanent magnet 11 is attached to the flange part of the spindle 8 and the soft magnetizable member 10 to the lower surface for loading the record bearing medium by virtue of a magnetic attraction can be employed in combination with the invented arrangement.

Further, in the control circuit shown in FIG. 4, the AND circuit 32 may be dispensed with where it is desired to have the motor 7 operative irrespective of the command to record or reproduce. The AND circuit 32 is thus not absolutely necessary.

In a modification example of the embodiment described, a switch for directly or indirectly detecting a release of the arm 23 from the pressing action may be arranged to be substantially responsive to the returning movement of the arm 23 from its operative position of FIG. 3(a) back to its initial position shown in FIG. 3(b). A pressing action release detection signal which is thus obtained through this switch is applied to the set input terminal S of the flip-flop 31 in place of the output of the one-shot circuit 29. The flip-flop 31 is thus may be arranged to be set by this detection signal in response to the release of the arm 23 from the pressing action. This modification can be arranged exactly in accordance with the arrangement disclosed in the above U.S. patent application Ser. No. 591,383.

In accordance with the invention, as described in detail in the foregoing, a recording and/or reproducing apparatus of the kind described in the background description of this specification is enabled to accurately and reliably mount the record bearing medium on the rotating drive means without imposing a large load on the rotating drive means. The invented arrangement permits reduction in size of the rotating drive means. Besides, in loading the record bearing medium, the operation timing of the rotating drive means is controlled to ensure that the medium is safely and reliably loaded and that the medium is smoothly rotated after loading. Therefore, the invention is quite advantageous for the recording and/or reproducing apparatus of this kind.

This invention is not limited to the embodiment and modification examples given in the foregoing and various modifications and variations may be made without departing from the spirit and scope of the following claims.

What is claimed is:

1. A recording and/or reproducing apparatus using a disc-shaped record bearing medium, comprising:
   (A) a recording and/or reproducing head;
   (B) drive means for rotating the medium relative to said head;
   (C) holder means movable between a first position for receiving the medium and a second position for placing the received medium at a predetermined position for signal recording and/or reproducing;
   (D) detecting means for detecting that said holder means has reached said second position;
   (E) pressing means arranged to apply no pressing action to press a portion of the medium against said drive means until said detecting means detects that the medium has reached said predetermined position and to apply the pressing action to press said portion of the medium against the drive means thereby to mount the medium on the drive means after said detecting means detects that the medium has reached said predetermined position and then to release said pressing action after a lapse of a predetermined period of time;
   (F) instruction means for instructing said drive means to rotate the medium; and
   (G) control means arranged to monitor the pressing action of said pressing means and to activate said drive means to rotate the medium when said pressing action by said pressing means has been released and said instruction means instructs said drive means to rotate the medium.

2. An apparatus according to claim 1, wherein said pressing means includes a plunger.

3. An apparatus according to claim 2, wherein said plunger is operated according to the result of detection by said detecting means.

4. An apparatus according to claim 1, wherein said pressing means is arranged so as to press said portion of the medium during said predetermined period of time.

5. An apparatus according to claim 1, wherein said detecting means includes:
   (a) detecting signal generating means for detecting that said medium has reached the predetermined position and for generating a detecting signal; and
   (b) delaying means for delaying said detecting signal generated by said detecting signal generating means for a predetermined period of time.

6. An apparatus according to claim 5, wherein said pressing means includes:
   (a) a solenoid; and
   (b) activating means for generating an activating signal to activate said solenoid for said predetermined period of time according to the detecting signal delayed by said delaying means.

7. An apparatus according to claim 6, wherein said control means is arranged so as to activate said drive means to rotate the medium when said activating means stops generation of the activating signal and said instruction means instructs said drive means to rotate the medium.

8. An apparatus according to claim 1, wherein the instructions of said instruction means include an instruction for initiating recording and/or reproducing operation.

9. A magnetic recording and/or reproducing apparatus using a disc-shaped magnetic sheet which is provided with a center core having an engaging hole and is housed within a cassette having an opening for exposing a portion of the magnetic sheet, said apparatus comprising:
   (A) a magnetic head for recording signals on and/or reproducing recorded signals from the magnetic sheet, said head being arranged to confront a recording surface of the magnetic sheet through the opening of the cassette;
   (B) a spindle engageable with the center core at the engaging hole thereof for rotating the magnetic sheet relative to said head;
   (C) a motor for rotating said spindle;
   (D) a pressing member for pressing the center core relative to said spindle to mount the magnetic sheet on the spindle;
   (E) a cassette holder movable between a first position for receiving the cassette and a second position for placing the received cassette at a predetermined position relative to said head and said spindle;
   (F) detecting means for detecting that said cassette has reached said predetermined position by means of said cassette holder;
   (G) pressing member drive means for driving said pressing member so that said pressing member applies no pressing action to press the center core onto said spindle until said detecting means detects that the cassette has reached said predetermined position and applies the pressing action to press the center core against said spindle after said detecting means detects that the cassette has reached said predetermined position and then releases said pressing action after a lapse of a predetermined period of time;
   (H) instruction means for instructing said motor to rotate said spindle; and
   (I) control means arranged to monitor the pressing action of said pressing member and to activate said motor to rotate said spindle when said pressing action of the pressing member has been released and said instruction means instructs said motor to rotate said spindle.

10. An apparatus according to claim 9, wherein said detecting means includes:

(a) detecting signal generating means for detecting that said cassette has reached the predetermined position and for generating a detecting signal; and
(b) first delaying means for delaying the detecting signal generated by said detecting signal generating means for said predetermined period of time.

11. An apparatus according to claim 10, wherein said pressing member drive means includes:
(a) a solenoid for driving said pressing member; and
(b) activating means for generating an activating signal to activate said solenoid for said predetermined period of time according to the detecting signal delayed by said first delaying means.

12. An apparatus according to claim 11, wherein said control means is arranged to activate said motor to rotate said spindle when said activating means stops generation of the activating signal and said instruction means instructs said motor to rotate the spindle.

13. An apparatus according to claim 11, wherein said control means includes second delaying means for delaying the activating signal generated by said activating means for a further predetermined period of time and said control means is arranged to activate said motor to rotate said spindle when the activating signal delayed by said second delaying means stops its generation and said instruction means instructs said motor to rotate said spindle.

14. An apparatus according to claim 9, wherein said pressing member drive means is arranged to drive said pressing member so that said pressing member presses said center core against said spindle during said predetermined period of time.

15. An apparatus according to claim 9, wherein the instructions in said instructions means include an instruction to initate a recording and/or reproducing operation.

16. A recording and/or reproducing apparatus using a disc-shaped record bearing medium, comprising:
(a) a recording and/or reproducing head;
(b) drive means for rotating the medium relative to said head;
(c) holder means movable between a first position for receiving the medium and a second position for placing the received medium at a predetermined position for signal recording and/or reproducing;
(d) detecting means for detecting that said medium has reached said predetermined position by means of said holder means;
(e) pressing means arranged to apply no pressing action to press a portion of the medium against said drive means until said detecting means detects that the medium has reached said predetermined position and to apply the pressing action to press said portion of the medium against said drive means to mount the medium on the drive means during a first period of time after said detecting means detects that the medium has reached said predetermined position and then to release said pressing action after the lapse of said first period of time;
(f) instruction means for instructing said drive means to rotate the medium; and
(g) control means arranged to activate said drive means to rotate the medium, when a second period of time, which is longer that said first period of time, has lapsed after said detecting means detects that the medium has reached said predetermined position, during a time when said instruction means is instructing said drive means to rotate the medium.

17. An apparatus according to claim 16, wherein said detecting means includes:
detecting signal generating means for detecting that the medium has reached the predetermined position and for generating a detecting signal.

18. An apparatus according to claim 17, wherein said detecting means further includes:
delaying means for delaying said detecting signal generated by said detecting signal generating means for a predetermined period of time.

19. An apparatus according to claim 17, wherein said pressing means includes:
(a) a solenoid; and
(b) activating means for generating an activating signal for actuating said solenoid during said first period of time according to said detecting generated by said detecting signal generating means.

20. An apparatus according to claim 19, wherein said control means includes delaying means for applying, to said activating signal generated by said activating means, delay of a third period of time corresponding to a difference between said first period of time and said second period of time, thereby producing a delayed output, and said control means being arranged to activate said drive means to rotate the medium when the activating signal delayed by said delaying means stops its generation during the time when said instruction means is instructing said drive means to rotate the medium.

21. An apparatus according to claim 16, wherein the instructions of said instruction means includes an instruction for initiating a recording and/or a reproducing operation.

* * * * *